United States Patent [19]

McGill

[11] Patent Number: 5,407,093
[45] Date of Patent: Apr. 18, 1995

[54] CONTAINER SYSTEM

[76] Inventor: Shane R. McGill, 3 Parrs Head Mews, George Lane, Rochester, Kent ME1 1NP, England

[21] Appl. No.: 108,718

[22] PCT Filed: Mar. 3, 1992

[86] PCT No.: PCT/GB92/00377
   § 371 Date: Sep. 2, 1993
   § 102(e) Date: Sep. 2, 1993

[87] PCT Pub. No.: WO92/15501
   PCT Pub. Date: Sep. 17, 1992

[30] Foreign Application Priority Data

Mar. 5, 1991 [GB] United Kingdom ................. 9104564

[51] Int. Cl.6 ............................................. B65D 1/44
[52] U.S. Cl. .................................... 220/666; 220/288; 220/670; 220/675; 215/1 C; 215/11.3; 222/215
[58] Field of Search ............... 222/391, 214, 215, 386, 222/386.5; 215/1 C, 11.3; 220/6, 666, 288, 212, 4.07, 4.06, 669, 670, 673, 675, 720

[56] References Cited

U.S. PATENT DOCUMENTS

| Re. 32,379 | 3/1987 | Touzani . | |
|---|---|---|---|
| 3,157,314 | 11/1964 | Nadler . | |
| 4,098,434 | 7/1978 | Uhlig . | |
| 4,492,313 | 1/1985 | Touzani . | |
| 4,773,458 | 9/1988 | Touzani . | |
| 4,921,147 | 5/1990 | Poirer | ................................. 220/666 |
| 5,002,193 | 3/1991 | Touzani | ................................. 220/666 |
| 5,071,034 | 12/1991 | Corbiere | ............................. 222/215 |
| 5,269,428 | 12/1993 | Gilbert | ................................. 215/1 C |
| 5,333,761 | 8/1994 | Davis et al. | ......................... 222/215 |

FOREIGN PATENT DOCUMENTS

| 406134 | 1/1991 | European Pat. Off. . |
|---|---|---|
| 1219079 | 5/1960 | France . |
| 372974 | 12/1963 | Switzerland . |

*Primary Examiner*—S. Castellano
*Attorney, Agent, or Firm*—Gifford, Krass, Groh, Sprinkle, Patmore, Anderson & Citkowski

[57] ABSTRACT

A container for containing a semi-solid product to be dispensed from the container by deformation in the axial direction, the container including a flexible part, a body part, and a cap part, each part having an open end, the cap part being securable to the body part to form a cylindrical container assembly, the side walls of the body part and of the cap part being deformable in the longitudinal direction to reduce the internal volume of the assembly and the assembly having a substantially constant external dimension over the side walls of the body part and the cap part, the body part having threads least towards its open end in its side wall and the cap part having threads towards its open end and in its side wall where the cap part and the body part may be secured to one another by interengagement of the threads, one of the parts having an outlet opening through which the contents of the assembly may be discharged upon deformation of the container assembly.

12 Claims, 1 Drawing Sheet

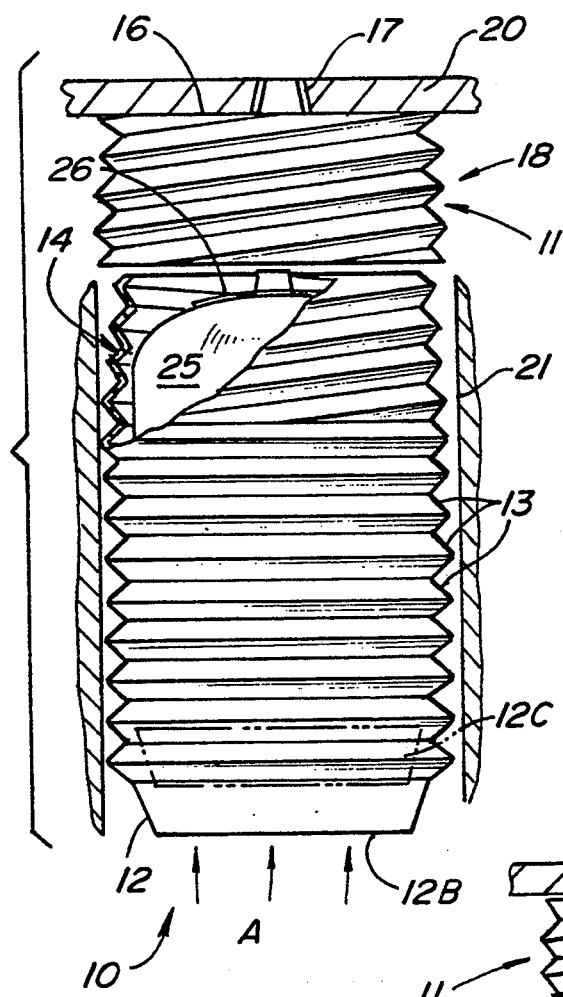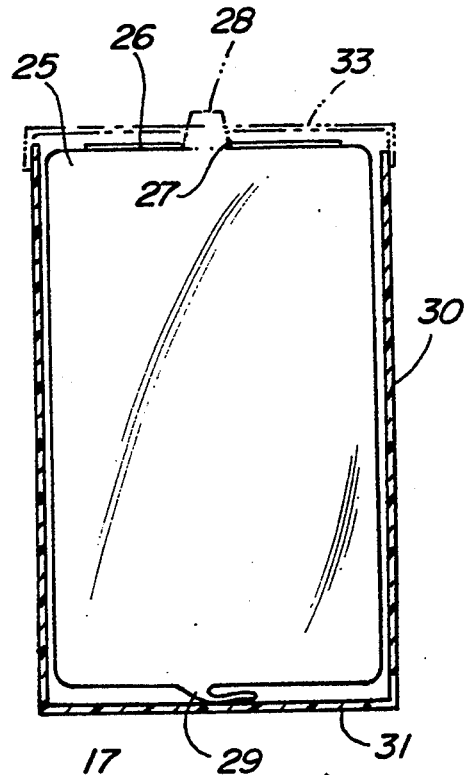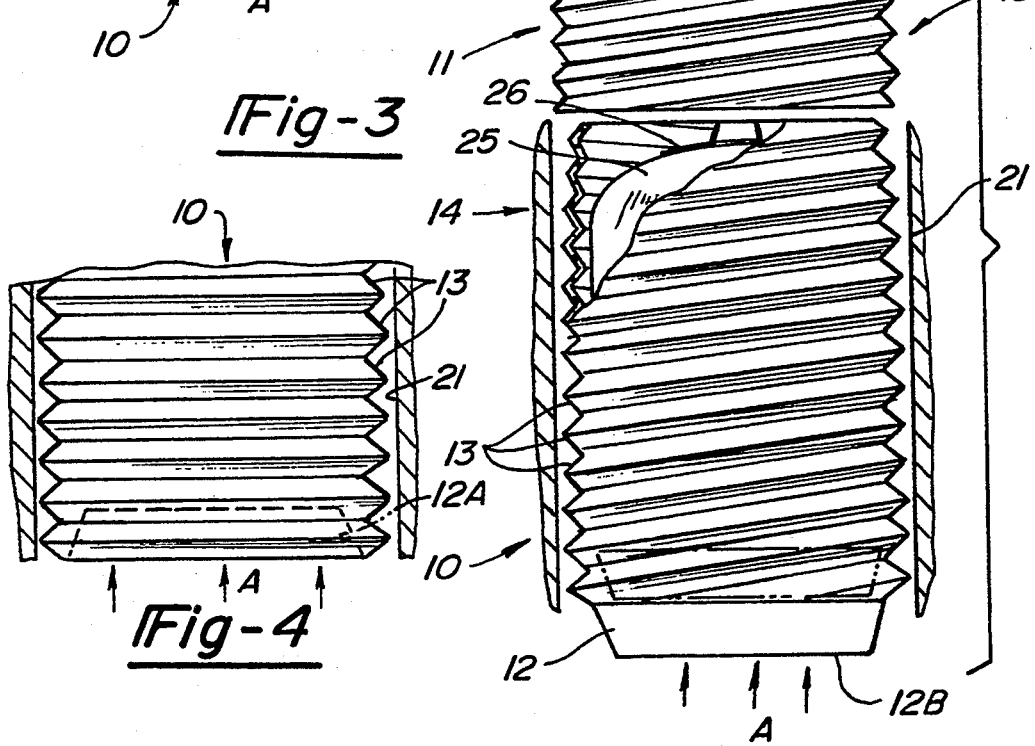

CONTAINER SYSTEM

This invention relates to container systems and in particular to two-part containers intended to be deformable.

In earlier patent specifications, British patent application No. 2,213,532 and British patent application No. 2,234,556 there is described a dispensing apparatus utilising a deformable container for containing semi-solid product to be dispensed from the container by deformation in the axial direction of the container. In order to fill such containers with product access is normally gained through the outlet opening. In some cases it is preferred to locate a block of pre-frozen product in the container which requires that the opening for admitting the block is of substantially the same dimensions as the cross-section of the container. At the same time the container should retain its deformation characteristics.

An object of the invention is to provide an improved deformable container.

According to the invention a container system comprises two flexible parts, a body part and a cap part, each part having an open end, the cap part being securable to the body part to form a cylindrical container assembly, the side walls of the body part and of the cap part being deformable in the longitudinal direction to reduce the internal volume of the assembly and the assembly having substantially constant external dimensions over the side walls of the body part and the cap part, the body part having thread means at least towards its open end in its side wall and the cap part having thread means towards its open end and in its side wall whereby the cap part and the body part may be secured to one another by interengagement of the thread means, one of the parts having an outlet opening through which the contents of the assembly may be discharged upon deformation of the container assembly.

Preferably the thread means of each part is arranged so that the outer pitch diameter of one of the parts decreases towards its open end and the inner pitch diameter of the other part increases towards its open end. By this arrangement it becomes easier and there is less resistance in threading the cap part onto the body part, full interengagement of the threads being achieved when the cap part is fully located on the body part. The facility of easy location on the body part is desirable because of the relatively large diameter of the container assembly which may otherwise give rise to excessive resistance to location of the cap part onto the body part. Alternatively the threaded interengagement may be by conventional constant diameter threads.

The arrangement of a threaded interconnection between the body part and the cap part ensures that the container assembly over the interengaging threaded region is Still able to be deformed in the axial direction. At the same time egress of the contents of the container through the connection is prevented. The thread form for interengagement may extend over two or more threads axially of the parts.

By this arrangement the body part may be filled with product in a block substantially the internal size of the body part. After insertion the cap part is located in threaded engagement with the body part to define a closed container substantially filled with product.

Conveniently the thread means on each of the body part and the cap part extends from the open end to adjacent the opposite end of the part. Moreover the thread form of the body part may be of constant diameter over that part of the body part not to be interengaged by the cap part.

Preferably the body part and the cap part are deformable by the closing up of the interengaged thread forms, and the body part is additionally deformable over its side walls not interengaged with the cap part. Conveniently the outlet opening is formed centrally in the end wall opposite said open end of the cap part or of the body part.

The container system may additionally comprise a deformable bag for location within the assembly and for containing product therein for discharge through said outlet opening, the bag having a discharge outlet opening for cooperation with the outlet opening of the assembly in use. Such inner bag may have around its outlet opening a relatively thicker region arranged to engage the assembly adjacent the outlet opening of the assembly. Such discharge opening is arranged to be aligned with the container outlet opening to permit the discharge of product from the bag and from the container assembly. The opposite end of the bag would normally be the inlet opening for receiving product into the bag and the bag may be of a length greater than that of the container assembly so that the excess portion can be closed, after filling of the bag with product, by a closure member. The inner bag would be made of flexible sheet material which can be deformed as the inner bag is discharged during deformation of the outer container assembly.

In practice the inner bag can be charged with product on site or at a location remote from the outer container for transport to the filling site. At this site the inner bag is loaded into the body part of the container and the cap part is then located on the body part to enclose the bag and the product therein.

During transportation the inner bag may be located within a rigid tube of cardboard or the like for protection. Moreover the opening at the end of the inner bag is sealed for transportation by, for example, a peel-off strip. The base of the inner bag may rest against a base portion of the cardboard tube. It will be appreciated that before the inner bag is located in the container assembly it is removed from the cardboard tube.

Upon full discharge of the product from the container the cap part is unscrewed from the body part and the empty inner bag is taken out from between the body part and the cap. If necessary the container is then cleaned and is ready to receive a further charge of product.

By the use of an inner bag containing the product the container assembly becomes reusable and the product is easily accommodated within the container.

Further features of the invention will appear from the following description of embodiments of the invention given by way of example only and with reference to the drawings, in which:

FIG. 1 shows a side elevation of a two-part container assembly,

FIG. 2 shows an inner bag for use in the container assembly of FIG. 1,

FIG. 3 shows an alternative two-part container assembly, and

FIG. 4 is a fragmentary view of an alternative two-part container assembly.

Referring to FIGS. 1 and 2 of the drawings and firstly to FIG. 1 a two-part deformable container assembly is shown. The container has a body part 10 and a cap part 11 both of generally cylindrical shape and each open at one end.

The body part 10 has at one, closed end a domed shape 12 which is capable of being moved to the position shown at 12C upon pressure being applied to the end surface 12B of the domed portion 12. Alternatively the end may be supplied shaped as at 12A, as shown in FIG. 4 that is, recessed into the interior of the body part 10.

In the FIG. 1 embodiment the body part 10 has a series of circumferential corrugations 13 extending away from the closed end towards the opposite, open end of the body part 10. At said open end of the body 10 is formed an externally threaded portion 14. As will be seen the outer pitch diameter of the threaded portion 14 decreases progressively towards the open end.

The cap part 11 of the container, shown in FIG. 1 before location on the body part 10, is also of generally cylindrical shape having at one end a surface 16 at a right angle to the axis of the container. Centrally of the surface 16 is formed a tapered outlet nozzle 17. The cap 11 is formed over its side wall with a screw-threaded portion 18 extending away from the nozzle 17 and the inner pitch diameter of the threaded portion 18 increases in the direction away from the nozzle 17 towards its open end. Alternatively the surface 16 can be tapered with the nozzle. As a further alternative the outlet may be displaced from a central position towards the outer diameter and the nozzle may be omitted.

It will be seen that, due to the tapering of the inner and outer pitch diameters of the threaded portions 18 and 14 respectively of the cap 11 and the body 10, the cap 11 can be screwed onto the body part 10 without high frictional contact between the interengaging threaded surfaces. In this way the cap can be located on the body part in full threaded engagement relatively quickly and easily and can be unscrewed in a similar manner. At the same time the complementary threaded portions prevent egress of product from within the container except through the outlet 17 especially due to the internal pressure on the container during use which expands the inner threads into engagement with the outer threads.

Alternatively the interengaging threaded portions 18 and 14 may have conventional constant diameter inner and outer pitch diameters.

The number of threads employed over the threaded portions 18 and 14 may be increased and decreased from the illustrated arrangement but there would normally be a minimum of two complete threads on each portion.

It will be seen that with the cap 11 detached from the body part 10 product can be located within the body part 10, for example as an extruded cylindrical block, almost filling the body part 10 up to the inner edges of the corrugations 13. After the block of product is located in the body part 10 the cap 11 is threaded onto the open end of the body part until it is fully engaged. In this way hard and frozen product such as ice cream, frozen yoghurt etc. at say −12° C. can be loaded into the container thereby retaining the product at a high quality due to the low temperature.

In one arrangement the assembled container is located within a housing having, at one end, a plunger (not shown) which can engage the container in the direction A. The opposite end of the container is located against an abutment 20, shown schematically, and the housing is in close proximity to the outer surface of the container as at 21. Upon application of pressure via the plunger in the direction A the container is longitudinally compressed and the corrugated side walls of the container and the threaded portions are deformed to enable product within the container to be discharged through the outlet opening 17 thereby dispensing product from the deformable container assembly. During deformation the corrugations 13 and the interengaging threads close up and the length of the container is reduced.

Suitable apparatus for such a dispensing operation is described in our patent specifications Nos. 2,213,532 and 2,234,556. The container described is particularly suitable for dispensing semi-solid material which is in a frozen or cold condition, the housing 21 being refrigerated for this purpose. However it may find application in dispensing other products.

Referring now to FIG. 2, another arrangement is described by which the product is located within the container of FIG. 1 without it coming into intimate contact with the inner walls of the container. In this arrangement a cylindrical block of the product is located in a flexible bag 25. The bag 25 is generally cylindrical having a diameter approximating to that of the inner diameter of the container. The length of the bag 25 is greater than the length of the block of product and, at one end the bag carries an annular member 26 with a central opening 27. The member 26 may be an annular disc of relatively stiffer or thickened construction than the bag 25 which, in use, will engage against the outlet end 16 of the container. The opening 27 is arranged to be at the position of and aligned with the outlet nozzle 17 of the container. Moreover the opening 27 may carry a nozzle 28 for location within the outlet nozzle 17 or through an opening in the cap part 11 when the nozzle 17 is omitted. In either case the opening 27 or the nozzle 28 is provided with a detachable seal which is removable prior to the bag 25 being introduced into the container. The nozzle 28 may be secured to the cap part 11 by a nut or other securing means (not shown) to secure the bag 25 to the part 11.

The bag 25 is longer than the block of product so that the end of the bag remote from the opening 27 can be tied by a closure member to maintain the product within the bag 25. The folded over closed end of the bag is indicated at 29. Other arrangements can be used to close the bag 25.

As shown in FIG. 2 the bag 25 is enclosed within a drum or carton 30 for transportation purposes. The drum 30 is of generally cylindrical construction having a base 31 on which the bag 25 is seated during transportation.

After arrival at its destination the bag 25 can be removed from the drum 30, preferably of cardboard material, for location into the container of FIG. 1 or FIG. 3.

It will be seen that the bag 25 and its contents are located into the body part 10 of the container, prior to assembly of the cap 11 on the body part 10. The product within the bag 25 is kept out of contact with the inner walls of the container and upon deformation of the container the bag 25, being of flexible plastics material, deforms with the container and the product is expressed through the opening 27, the nozzle 28 (if present) and through the outlet nozzle 17 of the container.

The bag 25 can be located within the drum 30 in a position inverted compared with that shown in FIG. 2, especially if the nozzle 28 is omitted. It will also be appreciated that the drum 30 may also be provided with a lid 33, if necessary.

Referring now to FIG. 3 an alternative form of two part container is shown, the same reference numbers being used for similar parts. In this arrangement the body part 10 differs from that of FIG. 1 in having a side wall which is formed with a thread form throughout its length, instead of the circumferential convolutions 13, over the region of the body 10 towards its closed end. The thread form is a continuation of the thread form over the portion 14 but is of constant inner and outer pitch diameter.

In other respects the FIG. 3 embodiment operates as for the FIG. 1 embodiment and it will be seen that the cap 11 fits to the body 10 in the same way. Moreover the thread form of the main body still provides the means for the body 10 to deform during a discharge operation.

The container of the invention is intended to be reusable, especially when utilised with the inner bag arrangement.

In another arrangement the product is supplied in the bag 25 fitted over one end with the cap 11 of the container. In loading the bag 25 into the body part 10 of the container the cap 11 is secured to the body 10 and, after use, the cap 11 is released and disposed of, only the body 10 being reused. In this arrangement the bag 25 and the cap 11 may be united, the member 26 being omitted.

In another arrangement the cap part 11 and the body part 10 may be united after assembly, and containing the product, as by welding, adhesive or the like. In this case the assembly may not be reusable.

Instead of the connection between the body 10 and cap 11 being as shown, the parts may be releasably connected towards the end 12 or at any position between the ends. Moreover there may be connections between a cap and a body and between the body and a base member.

The outlet from the cap part 11 or the bag may be provided with a closure of a kind in which it is evident whether the closure has been tampered with.

The container system of the invention can also be applied to collapsible containers of the kind described in U.S. Pat. Nos. 4,492,313, 4,773,458 and Re. 32,379.

I claim:

1. A container system which comprises two flexible parts, a body part and a cap part, each part having an open end, and a side wall the cap part being securable to the body part to form a cylindrical container assembly, the side walls of the body part and of the cap part being deformable in the longitudinal direction to reduce the internal volume of the assembly, and the assembly having substantially constant external dimensions over the side walls of the body part and the cap part, the body part having threads at least towards its open end in its side wall and the cap part having threads towards its open end and in its side wall wherein the cap part and the body part are secured to one another by interengagement of the threads, one of the parts having an outlet opening through which the contents of the assembly are discharged upon deformation of the container assembly.

2. A container system according to claim 1 wherein the threads of each part are arranged so that the outer pitch diameter of one of the parts decreases towards its open end and the inner pitch diameter of the other part increases towards its open end.

3. A container system according to claim 1 wherein the threads on each of the body part and the cap part extends from the open end to adjacent the opposite end of the part.

4. A container system according to claim 3, wherein a thread form of the body part is of constant diameter over that portion of the body part not to be interengaged by the cap part.

5. A container system according to claim 1 wherein the body part and the cap part are deformable by the closing up of interengaged thread forms, and the body part is additionally deformable over that portion of its side wall not interengaged with the cap part.

6. A container system according to claim 1 wherein the outlet opening is formed centrally in the end wall opposite said open end.

7. A container system according to claim 6 wherein the outlet opening is formed with an outlet tube extending from said end wall away from the interior of said assembly.

8. A container system according to claim 1 wherein the end wall of one of said parts is provided with a recessed area extending within the assembly.

9. A container system according to any one of the preceding claims comprising a deformable bag located within the assembly and for containing product therein for discharge through said outlet opening, the bag having a discharge outlet opening for cooperation with the outlet opening of the assembly in use.

10. A container system according to claim 9 wherein the deformable bag has around its outlet opening a relatively thicker region arranged to engage the assembly adjacent the outlet opening of the assembly.

11. A container system according to claim 9 wherein the deformable bag has a closable opening towards the end of the bag opposite said discharge outlet opening through which closable opening the product may be introduced into the bag for discharge from the assembly.

12. A container system according to claim 9 wherein the deformable bag is formed of flexible sheet material.

* * * * *